May 15, 1934.  R. H. ROSENBERG  1,959,306
METHOD AND MEANS FOR CUTTING A CURVILINEAR ARTICLE
Filed May 28, 1932   2 Sheets-Sheet 2
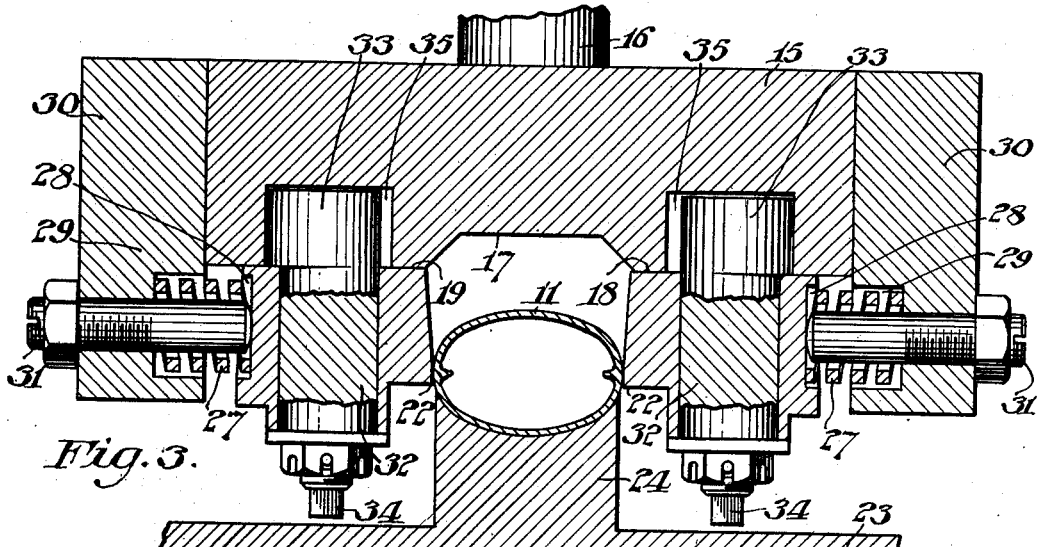
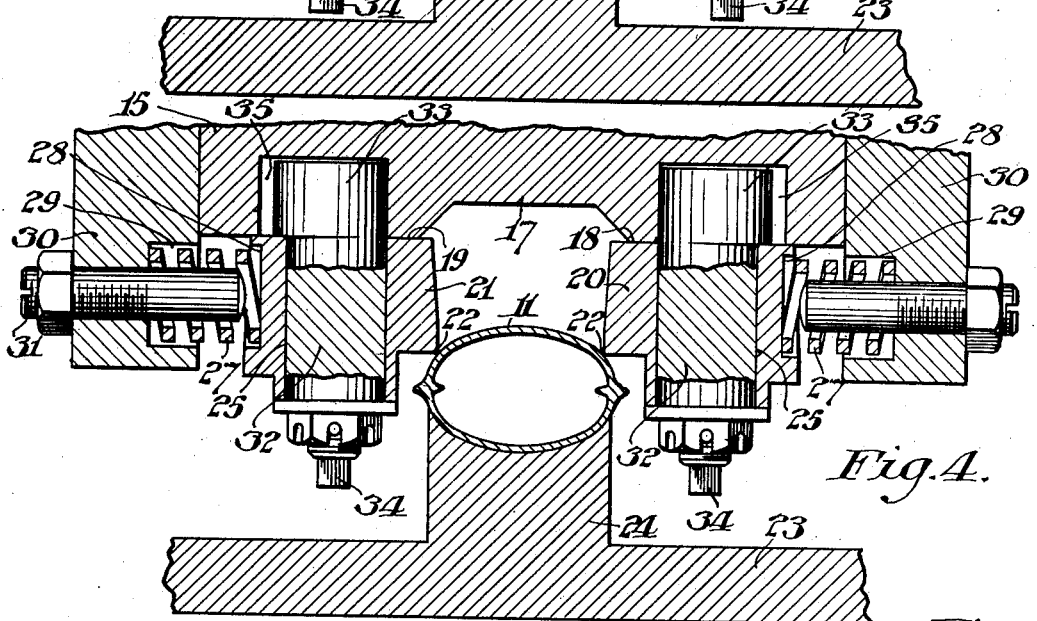
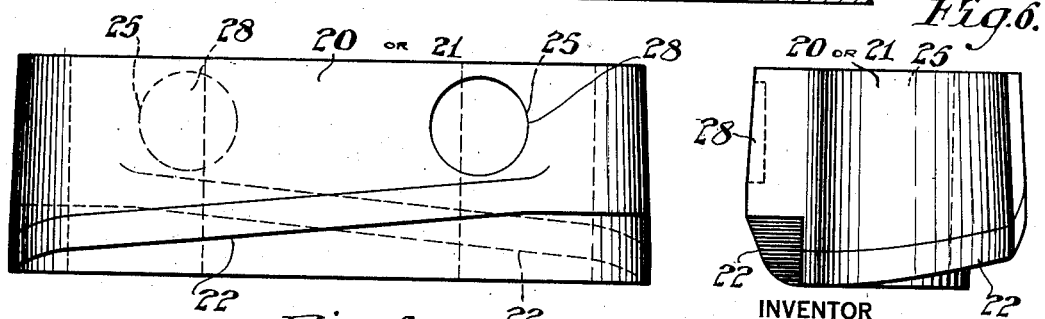
INVENTOR
RALPH H. ROSENBERG
BY
John P. Barbor
ATTORNEY Patented May 15, 1934

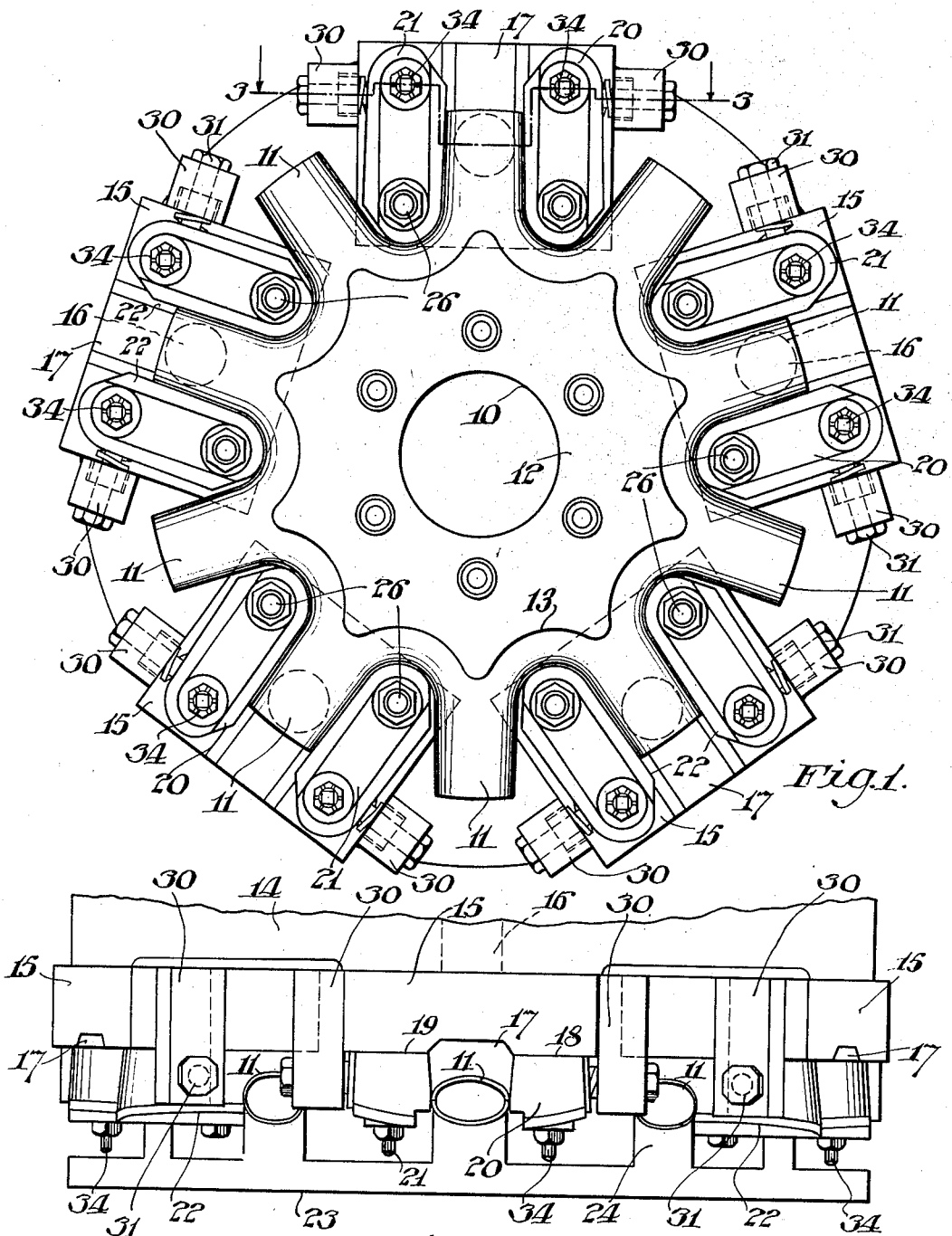

1,959,306

UNITED STATES PATENT OFFICE 1,959,306

METHOD AND MEANS FOR CUTTING A CURVILINEAR ARTICLE

Ralph H. Rosenberg, Philadelphia, Pa., assignor to Budd Wheel Company, Philadelphia, Pa., a corporation of Pennsylvania Application May 28, 1932, Serial No. 614,259

8 Claims. (Cl. 164—34)

The invention relates to a method of fabricating a vehicle wheel and particularly concerns the method of trimming the flash from a welded artillery wheel spoke body.

Such a wheel body is commonly known and will be hereinafter referred to as a spider. Spiders of this nature are fabricated by a well-known method, consisting of flash welding a pair of complemental spider halves along a median plane parallel to the plane of the wheel. This flash welding step leaves a feather-edged fin on the weld line on the interior and exterior of the spider, and obviously the exterior fin must be removed prior to further assembly of the wheel. The interior flash or fin need not be removed as it is not seen in the finished wheel. Heretofore the exterior flash or fin has been removed by hand grinding, or by sand-blasting, either of which methods is too slow and uncertain for high production of wheels.

It is the object of the invention to provide a method of trimming the flash cleanly and quickly, avoiding the use of uncertain hand-operated means. It is a further object of the invention to provide a trimming apparatus which will be flexible in operation so that instantaneous compensation will be made for small irregularities and variations in the object to be trimmed. Further, it is an object of the invention to balance the pressures incident to trimming the flash on the wheel, so that the deflecting tendencies set up will be mutually counteracted.

Broadly, I have attained the objects of my invention by providing an automatic shearing or cutting tool; by yieldably mounting such tool; and by equalizing the cutting forces exerted on a wheel.

Of the various forms in which my invention can be embodied I have selected for illustration and specific description herein the one that is believed to exhibit the invention in its preferred embodiment.

Referring now to the accompanying drawings,

Figure 1 is a bottom plane view of the apparatus, showing an artillery wheel spider in position, after being trimmed.

Figure 2 is a side elevation of the apparatus, showing a spider in position.

Figure 3 is a sectional view taken on line 3—3 of Fig. 1. This view shows the position of the apparatus after the flash has been trimmed.

Figure 4 is a corresponding view to Figure 3, showing the position of the apparatus immediately before the flash is trimmed.

Figure 5 is a side elevation view of a cutter block.

Figure 6 is an end elevation of the cutter block shown in Figure 5.

Referring to the drawings by reference numerals, 10 represents generally an artillery wheel spider having spokes 11 and a central nave portion 12. Wheel spider 10 is formed by welding together a pair of opposed complementally shaped stampings through their contiguous edges meeting in the central medial plane of the wheel body. Wheel body 10 is supported in an annular jig fixture 23 having a number of upwardly extending supporting portions 24 each having a dished face in which the spoke body is adapted to lie.

Numeral 14 indicates the vertically reciprocable head of a punch press of standard make. A series of generally rectangular mounting blocks 15 are demountably secured to the lower surfaces of head 14 by means of shanks 16 extending into the head. Mounting blocks 15 are mounted in annular equally spaced relationship about the press head and are arranged radially of the head. Blocks 15 are each provided with a centrally disposed groove portion 17, the purpose of which will later be explained.

The wheel 10, shown in Figure 1 particularly, has a series of ten spokes. This is not intended as a limitation, but merely as an embodiment showing a wheel now in commercial use. According to the present invention, I provide five mounting blocks 15 for a ten-spoke wheel, or more generally, one block for each two spokes 11. As shown in Figure 1 the recessed or grooved portion 17 in each block 15 is aligned radially in a vertical plane passing through the center of each spoke.

Blocks 15 on press head 14 are each provided with a pair of cutter blocks 20 and 21 respectively. Blocks 20 and 21 are right and left hand and are identical but opposite in design and contour. Each of the blocks 20 and 21 is further symmetrical about its central axis, embodying a reversible characteristic which increases the service life of the cutter. These cutter blocks 20 and 21 are shown particularly well in Figs. 5 and 6. Each embodies a pair of curvilinear cutting edges 22 extending symmetrically around the block from the end portions thereof to a point adjacent the opposite ends thereof. By looking at Fig. 5, it will be seen the cutting surface is of substantial width, the body of the blocks 20 and 21 being slightly tapered upwardly beyond the cutting surface. This feature allows the cutting edge to be ground and sharpened. Blocks 20 and 21 are provided with holes 25 adjacent each end thereof, through which holes blocks 20 and 21 are yieldably pivoted to mounting blocks 15.

As shown clearly in Figure 1, cutter blocks 20 and 21 are pivotally mounted at 26 adjacent the inner ends of spokes 11 and are yieldably mounted adjacent the outer ends of spokes 11 as shown in Figures 3 and 4. The yieldable mounting is afforded by springs 27 fitting into oppositely faced recesses 28 and 29 in the cutter blocks 20—21 and in blocks 30, respectively which are secured to the sides of the mounting blocks 15.

Stud 31 is threadedly connected to block 30 and passes through the central portion of recess 29, piloting spring 27, and limiting the pivoting movement of cutter blocks 20 and 21 as shown. A further limitation of the amount of pivoting movement is afforded by a barrel shaped stud 32 fitting in the outer hole 25 of cutter blocks 20 and 21 and provided with a cam portion 33 at its upper end. By turning the lower end 34 with a wrench, the cam portion 33 may be rotated to allow various positions or limitations for the pivoting cutter blocks 20 and 21. The cam portions 33 fit into annular recesses 35 in the mounting blocks 15.

It will be noted that the cutting edges 22, of curvilinear contour complemental to the shape of spokes 11, are arranged on the lower side of cutter blocks 20 and 21, and according to the arrangement shown in Figure 4, the space between the opposing cutter blocks 20 and 21 respectively is normally less than the width of the individual spokes measured along their major axes. At the curved portion of the wheel body 10 where the spokes adjoin each other, indicated by numeral 13, the cutting edge 22 is in perfect vertical alignment with the outside surface of the wheel body, and engages the wheel body at point 13, trimming the flash from this portion while the cutting edges shown in Figure 4 are still in a raised position.

As for the operation of the device, wheel body 10 is placed in jig 23 while head 14 of the press is in a raised position. With the wheel body 10 thus firmly seated, head 14, bearing the mounting blocks 15 and cutter blocks 20 and 21, is reciprocated or projected downwardly into operative position with respect to the wheel body 10. The resilience of springs 27 forces the outer ends of the cutter blocks 20 and 21 toward each other to the fullest extent afforded by the cams 33, abutting the side walls of recesses 35. As mentioned heretofore, the lowest part of the cutting edge 22, adjacent the inner ends of cutter blocks 20 and 21 engages the wheel body first, in the region between the spokes, as indicated at 13. As the press head 14 progresses downwardly, the shearing or cutting of the flash progresses from region 13 outwardly as the outer ends of cutter blocks 20 and 21 are forced apart as they ride down the inclined edges of the spokes. As the head 14 reaches its lowest position, as indicated in Figure 3, the cutting edges 22 of the cutter blocks 20 and 21 have reached their lowest position, and have completely removed the flash from both sides of spoke 11. It will be appreciated that if only one side of the spoke 11 were trimmed at a given time, a very severe deflecting tendency would be set up, tending to displace wheel 10 laterally from jig 23. This possibility I have eliminated by shearing both sides of a given spoke simultaneously, thus equalizing the deflecting tendencies and tending to minimize whatever vibrations might be set up by the shearing action.

As shown in Figure 1 each alternate spoke 11 is sheared simultaneously. Thus after one downward movement of the shearing mechanism, the head 14 of the press is raised, and the wheel body 10 indexed to a new position in jig 23, the wheel body being rotated through an angle corresponding to the angle between two adjacent spokes. Upon a second reciprocation of the press head 14 the balance of spokes 11 are trimmed. The inner end of the cutting edges 22 of cutter blocks 20 and 21, which trim the flash from the portion 13 of the wheel body cut slightly farther than the mid point between the spokes, thus after indexing the wheel body 10 and performing the two successive operations thereupon, the flash between the spokes is completely removed, by virtue of the overlapping relationship of the cuts.

The yieldable mounting of cutter blocks 20 and 21 makes provision for variations in spoke width, which variations are unavoidable in the usual commercial practices of wheel manufacture. The pivoting limitation afforded by cams 33 insures complete removal of the flash from both sides of the spoke. The adjustable feature of the studs 31 and cams 33 allow wheels having spokes of larger or smaller size to be trimmed without necessitating new equipment. The recessed or grooved portions 17 and blocks 15, being vertically aligned with the respective spokes, allows the press head to be reciprocated to the full depth of the cutter blocks 20 and 21 if such is desired.

The symmetrical arrangement of the blocks 20 and 21 makes these blocks reversible, thus increasing the service life of the individual blocks. This is a feature which makes for economy of manufacture. The provision of a curvilinear cutting edge 22 and cutter blocks 20 and 21 affords a progressive shear from the inner ends of the spokes to the outer, avoiding the setting up of a shock in the wheel body, which would be the case if a straight cutting edge were used, and the flash were removed simultaneously. This feature in conjunction with the idea of balancing the deflecting tendencies of the cutters by shearing opposite sides of the spokes simultaneously, makes for improvement in the finished product, as well as longer machine life.

It will be seen that the objects of my invention have been obtained in full by the foregoing provisions. By the use of my invention, the wheel may be completely trimmed in two simple operations, avoiding the necessity of lengthy hand trimming methods. The flexibility of design afforded by the yieldable mounting of the cutter blocks, combined with the adjustable features therein incorporated, make the apparatus available for a wide range of utility. The wheel body to be trimmed may be mounted in a simple jig fixture because of the fact that the deflecting tendencies set up by the cutters 20 and 21 are equalized.

Modifications of the invention herein shown and described will be obvious to those skilled in the art. I do not therefore wish to be limited by the circumferential terminology of the specification but rather solely by the scope of the appended claims which should be read with the breadth of understanding commensurate with the generic spirit of my invention.

What I claim is:

1. A tool for trimming a curvilinear article, said tool comprising a reversible block having curvilinear trimming edges complementally shaped with respect to said article, said block being reversible whereby its service life is increased.

2. A tool for removing the flash from a vehicle wheel having spokes a part of said tool being yieldably mounted, the travel thereof being limited by a cam, said cam being adjustable whereby to compensate for variations in spoke width, and for different spoke sizes, and an additional travel limiting means comprising an adjustable stud seated in a fixed part of said tool and projecting toward the yieldably mounted portion.

3. The method of removing the flash from a wheel having a plurality of spokes which comprises alternately telescoping a head having a number of cutting tools less than the number of spokes to an operative position with respect to said spoked wheel, withdrawing said head, and indexing said wheel to new positions whereby to remove the flash from all of said spokes.

4. A tool for removing the flash from a vehicle wheel having spokes, said tool comprising a block having oppositely extending complementally shaped shearing edges, said block being pivotally mounted, whereby to compensate for variations in spoke width, and yielding means biasing said cutting edges toward said spokes, and means pre-determinately limiting the compensating actions of said block.

5. A machine for removing the flash from a spoked vehicle wheel, comprising a plurality of oppositely disposed complementally shaped spoke trimming edges, plural groups of said cutting edges, pivotal connections therefor, and yielding means biasing said cutting edges about said pivoted connections, and means pre-determinately limiting said yielding action.

6. The method of removing the flash from a plural spoked vehicle wheel which comprises supporting a substantial portion of said spokes, alternately reciprocating a cutter block, whereby to simultaneously and progressively trim both sides of a spoke, and equalize deflecting forces and indexing the wheel, whereby to remove the flash from the respective spokes, the cuts on adjoining spokes overlapping.

7. A cutting tool for removing the flash from spoked vehicle wheels, comprising a main body portion having cutting edges of contour complemental to said spoke, said cutting edges oppositely extending to provide reversibility of the tool, said cutting edges uniformly displaced vertically, whereby to provide a progressive cutting action, and terminating at either end portion of the tool in such a manner as to provide an overlapping portion of trimmed material.

8. A cutting tool for trimming the flash from spoked vehicle wheels, comprising a cutter block arranged with complemental spoke contoured cutting edges, said block being pivotally mounted adjacent one end thereof, and yieldably mounted at the opposite end, whereby to provide automatic compensation for slight irregularities of spoke contour, and cam means pre-determinately limiting said compensating action.

RALPH H. ROSENBERG.